US012584539B2

(12) United States Patent
Wang

(10) Patent No.: US 12,584,539 B2
(45) Date of Patent: Mar. 24, 2026

(54) INTEGRATED ARTICULATED POWER UNIT AND LEGGED ROBOT USING THE SAME

(71) Applicant: HangZhou YuShu TECHNOLOGY CO., LTD., Hangzhou (CN)

(72) Inventor: Xingxing Wang, Hangzhou (CN)

(73) Assignee: HANGZHOU YUSHU TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/845,200

(22) PCT Filed: Dec. 14, 2022

(86) PCT No.: PCT/CN2022/139019
§ 371 (c)(1),
(2) Date: Sep. 9, 2024

(87) PCT Pub. No.: WO2023/169034
PCT Pub. Date: Sep. 14, 2023

(65) Prior Publication Data
US 2025/0189011 A1 Jun. 12, 2025

(30) Foreign Application Priority Data

Mar. 11, 2022 (CN) .......................... 202210237569.4

(51) Int. Cl.
*F16H 1/28* (2006.01)
*F16H 57/08* (2006.01)
*B62D 57/032* (2006.01)

(52) U.S. Cl.
CPC ............. *F16H 1/28* (2013.01); *F16H 57/082* (2013.01); *B62D 57/032* (2013.01); *F16H 2057/085* (2013.01)

(58) Field of Classification Search
CPC ........ F16H 1/28; F16H 57/082; B62D 57/032
See application file for complete search history.

(56) References Cited

U.S. PATENT DOCUMENTS 8,790,208 B2 * 7/2014 Poertzgen ............. B60T 13/741
475/149
10,106,132 B2 * 10/2018 Takeo ..................... B60T 13/74
2020/0230811 A1 7/2020 Kim et al.

FOREIGN PATENT DOCUMENTS

CN 210016365 U 2/2020
CN 210500331 U * 5/2020
(Continued)

OTHER PUBLICATIONS

CN-114810951-A (Year: 2022).*
CN-210500331-U (Year: 2020).*

*Primary Examiner* — Derek D Knight
(74) *Attorney, Agent, or Firm* — MUNCY, GEISSLER, OLDS & LOWE, P.C.

(57) ABSTRACT

The present application, relating to the technical field of legged robots, discloses an integrated articulated power unit and a legged robot using the same. The integrated articulated power unit provided by the present application comprises a base and a gearbox unit disposed within the base, the gearbox unit comprising a first planetary carrier; a mounting seat being coaxially provided within the base, and the first planetary carrier being sleeved within the mounting seat and rotatable relative to the mounting seat; a spacer and an input bearing being provided between the mounting seat and the first planetary carrier, and the first planetary carrier being fixed within the mounting seat by the spacer; and the edge of the spacer extending outward and against the mounting seat to form a concave groove matched with the mounting seat, so as to fix the spacer within the mounting seat. The present application provides a spacer, having an edge matched with the mounting seat, between the mounting seat and the first planetary carrier, so that when the spacer is pressed during rotation of the first planetary carrier, the (Continued)

spacer can always dovetail with the mounting seat, thus reducing the eccentricity runout of the first planetary carrier.

6 Claims, 3 Drawing Sheets

(56)                    References Cited

FOREIGN PATENT DOCUMENTS

| CN | 111516002 A | 8/2020 | |
|----|-------------|--------|---|
| CN | 212385507 U | 1/2021 | |
| CN | 213034612 U | 4/2021 | |
| CN | 113580201 A | 11/2021 | |
| CN | 114750852 A | 7/2022 | |
| CN | 114810951 A * | 7/2022 | ............. H02K 7/116 |

* cited by examiner $\dfrac{\text{III}}{4:1}$ $\dfrac{\text{I}}{4:1}$ $\dfrac{\text{II}}{4:1}$

INTEGRATED ARTICULATED POWER UNIT AND LEGGED ROBOT USING THE SAME

TECHNICAL FIELD

The present application relates to the technical field of legged robots, in particular, to an integrated articulated power unit and a legged robot using the same.

BACKGROUND

An articulated power unit is an important member of a legged robot, and a gearbox unit is an important part of the articulated power unit, and generally includes input and output planetary carriers.

A Chinese patent (Publication No. CN 213034612 U) discloses a rotary power unit with a compact structure and a robot using the same, the unit comprising a motor providing kinetic energy, a sun wheel connected to the rotor of the motor, and a planetary carrier and a planetary wheel cooperating with the sun wheel.

BRIEF SUMMARY

However, the above-mentioned planetary carrier constantly presses the base during rotation, rendering deformation and wear of the base or the planetary carrier, and further the possible disengagement of the planetary carrier with the base, thus affecting the rotation accuracy of the gearbox unit.

SOLUTION TO THE PROBLEM

Technical Solution

To overcome the deficiencies in the prior art, a first object of the present application is to provide an integrated articulated power unit providing a spacer, having an edge fastened to a mounting seat, between the mounting seat and a first planetary carrier, so as to increase the rotation accuracy of the gearbox unit.

A second object of the present application is to provide an integrated articulated power unit, in which a composite structure, that can resist the pressing force and impact force caused by the first planetary carrier, is formed by providing a spacer between a mounting seat and a first planetary carrier, so that when the spacer is pressed during the rotation of the first planetary carrier, the spacer is always propped to the mounting seat, to reduce the eccentricity runout of the first planetary carrier, and to improve the overall structural strength of the gearbox unit, thereby increasing the rotation accuracy of the gearbox unit.

A third object of the present application is to provide a legged robot with an integrated articulated power unit, provided at a joint thereof, in which a spacer having an edge fastened to a mounting seat is provided between the mount seating and a first planetary carrier, so as to increase the rotation accuracy of the gearbox unit.

To realize one of the above objects, a first technical solution of the present application is:

an integrated articulated power unit, comprising a base and a gearbox unit disposed within the base, the gearbox unit comprising a first planetary carrier;

a mounting seat being coaxially provided within the base, and the first planetary carrier being sleeved within the mounting seat and rotatable relative to the mounting seat;

a spacer and an input bearing being provided between the mounting seat and the first planetary carrier;

the first planetary carrier being assembled within the mounting seat by the input bearing and spacer;

the edge of the spacer extending outward and against the mounting seat to form a concave groove matched with the thin-wall periphery of the end of the mounting seat, to snugly mate and connect the spacer with the thin-wall periphery of the end of the mounting seat.

As a preferred technical measure, the gearbox unit comprises a second planetary carrier and an output bearing coaxial to the base;

the second planetary carrier is sleeved within the base by the output bearing; and the end face of the second planetary carrier extends radially outward to form a protective portion covering the output bearing and the base, and an operation gap is between the protective portion and the end face of the base.

The protective portion formed by the end face of the second planetary carrier covers both the output bearing and base. Thus, when the second planetary carrier is impacted by an axial external force, the protective portion first contacts the base, avoiding further transmission of the impact due to the external force to the output bearing, and thus avoiding damage to the output bearing and the internal parts connected thereto. That is, when the second planetary carrier is moved by a relatively large external force, the protective portion of the second planetary carrier and the end face of the base will be in close contact with each other to transmit the external force directly, thereby effectively reducing the impact force from the second planetary carrier on the output bearing.

As a preferred technical measure, a motor unit is provided within the base, the motor unit comprising a motor rotor and a motor cable;

a cover plate and a cover plate fixing seat mated with each other are provided between the side wall of the motor rotor and the side wall of the base; and a receiving cavity receiving the motor cable is formed between the cover plate and the cover plate fixing seat, and the base to prevent interference of the motor cable with the motor rotor.

As a preferred technical measure, the motor unit comprises a motor stator and a driving circuit board driving the motor unit which are fixed in the base.

As a preferred technical measure, a sun wheel is coaxially fixed on the motor rotor, and a rotor rear bearing is provided between the motor rotor and the first planetary carrier;

the motor rotor is rotationally connected to the first planetary carrier by the rotor rear bearing;

a rotor front bearing is provided between the motor rotor and the second planetary carrier, and the motor rotor is rotationally connected to the second planetary carrier by the rotor front bearing; and the gearbox unit comprises an inner gear ring and a planetary gear which are mated with each other, the outer periphery of the inner gear ring is fixed directly within the mounting seat by being mated with the inner periphery of the mounting seat in a mutual concave-convex mating mode, and the sun wheel drives rotation of the planetary gear.

As a preferred technical measure, the spacer is a cushion ring in the form of a circular ring, and can effectively increase the structural strength of the mounting seat and has a low manufacturing cost.

To realize one of the above objects, a second technical solution of the present application is:

an integrated articulated power unit, comprising a mounting seat having a hollow cavity, and a planetary carrier rotationally connected to the mounting seat;

a spacer being provided at the side of the mounting seat opposite to the planetary carrier; and the spacer being mated with the mounting seat to form a structure capable of reducing deformation and wear of the mounting seat and/or the planetary carrier.

After continuous exploration and experimentation, the present application obtains a composite structure, that can resist a pressing force and an impact force caused by the planetary carrier, by providing a spacer between a mounting seat and the planetary carrier, so that when the spacer is pressed during rotation of the planetary carrier, the spacer is always propped to the mounting seat to reduce the eccentricity runout of the planetary carrier and to improve the overall structural strength of the gearbox unit, thereby increasing the rotation accuracy of the gearbox unit.

Further, the edge of the end of the mounting seat is relatively thin, and the spacer abuts against the edge of the mounting seat to form a composite structure, which can be effective in preventing the deformation of or even damage to the thin wall of the mounting seat to affect the service life of the entire gearbox unit when an extreme force is applied to the planetary carrier.

Further, when the spacer is made of elastic or flexible materials, it can effectively cushion the impact force caused by the planetary carrier, thus effectively avoiding deformation and wear of the mounting seat and/or the planetary carrier, and the solution is simple, and practical.

As a preferred technical measure, the spacer is an annular structure or a square structure or a circular structure, which is manufactured from metal or plastic or rubber, and abuts against or embedded in or covers the mounting seat, to form a composite structure that can effectively improve the structural strength of the mounting seat and the planetary carrier.

As a preferred technical measure, the planetary carrier is propped to the spacer by the input bearing, and is limited within the mounting seat (3) by the input bearing (18) and spacer (4); and the spacer bends toward the end of the mounting seat and forms a concave groove matched with the end wall of the mounting seat to mate the spacer with the end wall periphery of the mounting seat to form a composite reinforcing structure.

To realize one of the above objects, a third technical solution of the present application is:

a legged robot comprising the integrated articulated power unit as described above.

BENEFICIAL EFFECT OF THE PRESENT APPLICATION

Beneficial Effect

After continuous exploration and experimentation, the present application obtains a composite structure, that can resist a pressing force and an impact force caused by the planetary carrier, by providing a spacer between a mounting seat and the planetary carrier, so that when the spacer is pressed during rotation of the planetary carrier, the spacer always propped to the mounting seat to reduce the eccentricity runout of the planetary carrier and to improve the overall structural strength of the gearbox unit, thereby increasing the rotation accuracy of the gearbox unit.

Further, the integrated articulated power unit provided by the present application provides the spacer, having the edge matched with the mounting seat, between the mounting seat and the first planetary carrier, so that when the spacer is pressed during rotation of the planetary carrier, the spacer can always dovetail with the mounting seat to reduce the eccentricity runout of the planetary carrier and to improve the overall structural strength of the gearbox unit, thereby increasing the rotation accuracy of the gearbox unit. In addition, the first planetary carrier is in fixed mating connection to the thin-wall periphery of the end of the mounting seat that can be a tightly closed entire periphery, preventing deformation of the thin-wall mounting seat to damage the entire gearbox unit when an extreme force is applied to the planetary carrier.

The present application provides a legged robot having the integrated articulated power unit in which the spacer with the edge matched with the mounting seat is provided between the mounting seat and the first planetary carrier, so that when the spacer is pressed during rotation of the planetary carrier, the spacer can always dovetail with the mounting seat to reduce the eccentricity runout of the planetary carrier and to improve the overall structural strength of the gearbox unit, thereby increasing the rotation accuracy of the gearbox unit. In addition, the first planetary carrier is in fixed mating connection to the thin-wall periphery of the end of the mounting seat that can be a tightly closed entire periphery, preventing deformation of the thin-wall mounting seat to damage the entire gearbox unit when an extreme force is applied to the planetary carrier.

In the figures, the reference number is listed below: 1 Base; 2 First Planetary Carrier; 3 Mounting Seating; 4 Spacer; 5 Second Planetary Carrier; 6 Output Bearing; 7 Protective Portion; 8 Motor Rotor; 9 Cover Plate; 10 Cover Plate Fixing Seat; 11 Motor Stator; 12 Drive Circuit Board; 13 Sun Wheel; 14 Internal Gear Ring; 15 Planetary Gear; 16 Projection; 17 Recess; 18 Input Bearing; 19 Rotor Rear Bearing; and 20 Rotor Front Bearing.

DETAILED DESCRIPTION OF THE DISCLOSURE

To illustrate the object, technical solution and advantage of the present application, the present application is hereinafter described in further detail in conjunction with the figures and embodiments. It should be understood that the detailed description herein is intended only to explain the present application and is not intended to limit the application.

On the contrary, the present application encompasses any substitutions, modifications, equivalent methods, and solutions that are made within the spirit and scope defined by the claims of the present application. Further, for better understanding of the present application, specific details are recited in the detailed description of the application below. The application can be fully understood by those skilled in the art without the description of these details.

As noted, when two elements are "fixedly connected" or "fixedly coupled" or "rotationally connected", the two elements may be directly connected or an intermediate element may be present. In contrast, when the element is described as "being directly on" another element, an intermediate element is not present.

Unless otherwise defined, all technical and scientific terms used herein have the same meaning as understood by those skilled in the art of the present application. The terms used herein are intended only for the purpose of describing specific embodiments and are not intended to limit the embodiments. Term "and/or" used herein includes all combinations of one or more relevant listed items.

Figure 1:
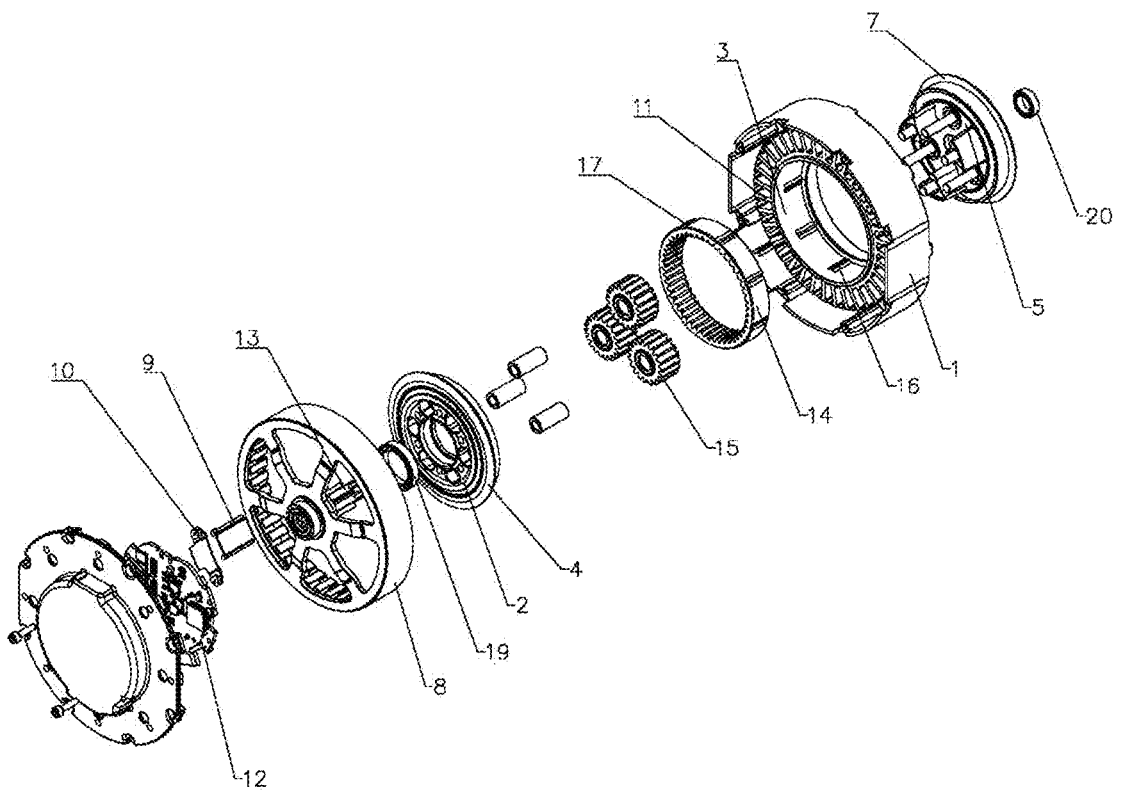
FIG. 1 is an exploded view of an integrated articulated power unit of the present application.
Figure 2:
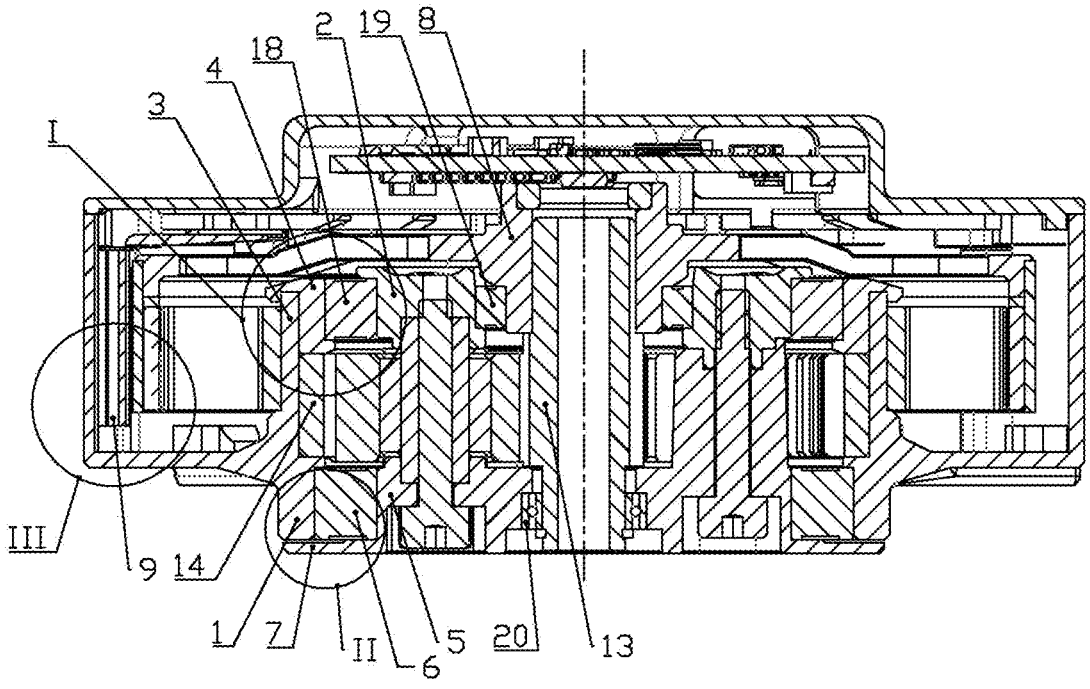
FIG. 2 is an overall sectional view of an integrated articulated power unit of the present application.
Figure 3:
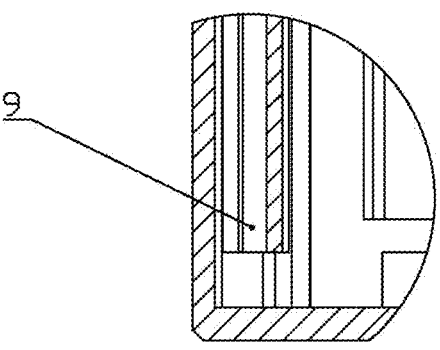
FIG. 3 is a partially enlarged view of an integrated articulated power unit of the present application.
Figure 3:
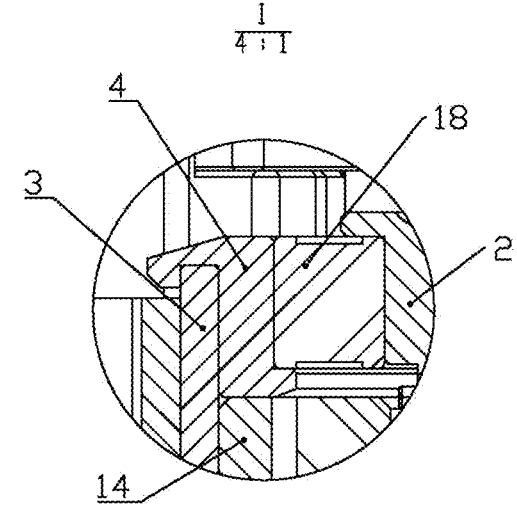
Figure 3:
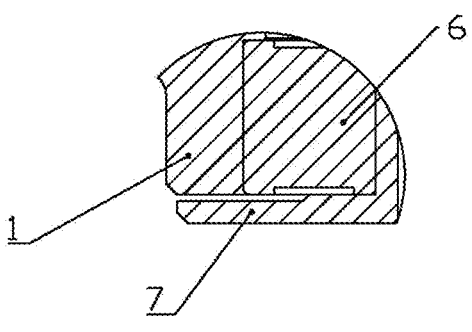

Referring to FIGS. 1-3, showing an optimal embodiment of the integrated articulated power unit of the present application, an integrated articulated power unit comprises a base 1 and a gearbox unit disposed within the base 1, the gearbox unit comprising a first planetary carrier 2;

a mounting seat 3 is coaxially provided within the base 1, and the first planetary carrier 2 is sleeved within the mounting seat 3 and is rotatable relative to the mounting seat 3;

a spacer 4 and an input bearing 18 are provided between the mounting seat 3 and the first planetary carrier 2;

the first planetary carrier 2 is assembled within the mounting seat 3 by the input bearing 18 and the spacer 4; and the spacer 4 is a spacer ring, which is made of metal and is effective in improving the structural strength of the mounting seat 3 with a low manufacturing cost.

The edge of the spacer 4 extends outward and against mounting seat 3 to form a concave groove matched with the thin-wall periphery of the end of the mounting seat 3, so as to snugly mate and connect the spacer with the thin-wall periphery of the end of the mounting seat 3.

The first planetary carrier may be an input planetary carrier.

A specific embodiment of the gearbox unit of the present application is:

the reduction gear unit comprising a second planetary carrier 5 and an output bearing 6 coaxial to the base 1, and an inner gear ring 14 and a planetary gear 15 which are mated to each other.

The second planet carrier 5 is sleeved within the base 1 by the output bearing 6;

the end face of the second planetary carrier 5 extends radially outward to form a protective portion 7 covering the output bearing 6 and the base 1, and an operation gap is between the protective portion 7 and the end face of the base 1.

The protective portion 7 formed by the end face of the second planetary carrier 5 covers the output bearing 6 and the base 1, so that when the second planetary carrier 5 is impacted by an axial external force, the protective portion 7 first contacts the base 1, avoiding further transmission the impact due to the external force to the output bearing 6, and thus avoiding damage to the output bearing 6 and the internal parts connected thereto. That is, when the second planetary carrier 5 is moved by a relatively large external force, the protective portion 7 of the second planetary carrier 5 and the end face of the base 1 will be in close contact with each other to transmit the external force directly, thereby effectively reducing the impact force from the second planetary carrier 5 on the output bearing 6.

The outer periphery of the inner gear ring 14 and the mounting seat 3 are fixed to each other by a projection 16 and a recess 17, and the sun wheel 13 drives rotation of the planetary gear 15.

The second planetary carrier may be an output planetary carrier.

In a specific embodiment of the motor unit of the present application, a motor unit is provided within the base 1, the motor unit comprising a motor rotor 8, a motor cable, a motor stator 11 and a drive circuit board 12 driving the motor unit.

A cover plate 9 and a cover plate fixing seat 10 mated with each other are provided between the side wall of the motor rotor 8 and the side wall of the base 1; and a receiving cavity receiving the motor cable is formed between the cover plate 9 and the cover plate fixing seat 10, and the base 1 to prevent interference of the motor cable with the motor rotor 8.

The motor stator 11 and the drive circuit board 12 are each fixed within the base 1.

A sun wheel 13 is coaxially fixed on the motor rotor 8, and a rotor rear bearing 19 is provided between the motor rotor 8 and the first planetary carrier 2.

The motor rotor 8 is rotationally connected to the first planetary carrier 2 by the rotor rear bearing 19; and a rotor front bearing 20 is provided between the motor rotor 8 and the second planetary carrier 5, and the motor rotor 8 is rotationally connected to the second planetary carrier 5 by the rotor front bearing 20.

In a specific embodiment of the integrated articulated power unit of the present application, an integrated articulated power unit comprises a mounting seat 3 having a hollow cavity, and a planetary carrier 2 rotationally connected to the mounting seat 3; and a spacer 4 is provided at the side of the mounting seat 3 opposite to the planetary carrier 2.

The spacer 4 is mated with the mounting seat 3 to form a composite structure capable of reducing deformation and wear of the mounting seat 3 and/or the first planetary carrier 2.

After continuous exploration and experimentation, the present application obtains a composite structure, that can resist a pressing force and an impact force caused by the planetary carrier, by providing the spacer 4 between the mounting seat 3 and the planetary carrier, so that when the spacer 4 is pressed during rotation of the planetary carrier, the spacer 4 is always propped to the mounting seat 3 to reduce the eccentricity runout of the planetary carrier and to improve the overall structural strength of the gearbox unit, thereby increasing the rotation accuracy of the gearbox unit.

Further, the edge of the end of the mounting seat 3 is relatively thin, and the spacer 4 abuts against the edge of the mounting seat 3 to form a composite structure, which can be effective in preventing the deformation of or even damage to the thin wall of the mounting seat 2 to affect the service life of the entire gearbox unit when an extreme force is applied to the planetary carrier.

Further, when the spacer 4 is made of elastic or flexible materials, it can effectively cushion the impact force caused by the planetary carrier, thus effectively avoiding deformation and wear of the mounting seat and/or the planetary carrier, and the solution is simple, and practical.

In a specific embodiment of the spacer 4 of the present application, the spacer 4 is an annular structure or a square structure or a circular structure, which is manufactured from metal or plastic or rubber, and abuts against the mounting seat 3 to form a composite structure that can effectively improve the structural strength of the mounting seat 3 and the planetary carrier.

A specific embodiment using the integrated articulated power unit of the present application is:

a legged robot comprising an integrated articulated power units described above.

In the present application, the fastened or fixed connection mode may be screw or welding or riveting or plugging connection or connection via a third component, and may be selected by those skilled in the art in the practice.

Finally, it should be noted that the above embodiments are only used to illustrate and are not intended to limit the technical solutions of the present application. Although the present application is described in detail with reference to the above embodiments, those of ordinary skill in the art should understand that the specific implementations of the present application may still be modified or replaced with equivalents, and that any modification or replacement that does not depart from the spirit and scope of the present application shall be covered by the scope of protection of the claims of the present application.

What is claimed is:

1. An integrated articulated power unit, wherein, a base and a gearbox unit disposed within the base are comprised, the gearbox unit comprising a first planetary carrier;

a mounting seat is coaxially provided within the base, and the first planetary carrier is sleeved within the mounting seat and is rotatable relative to the mounting seat;

a spacer and an input bearing are provided between the mounting seat and the first planetary carrier;

the first planetary carrier is assembled within the mounting seat by the input bearing and the spacer;

an edge of the spacer extends radially outward and against the mounting seat to form a concave groove matched with a thin-wall periphery of the end of the mounting seat, so as to snugly mate and connect the spacer with the thin-wall periphery of the end of the mounting seat;

the gearbox unit further comprises a second planetary carrier and an output bearing coaxial to the base;

the second planetary carrier is sleeved within the base by the output bearing; and an end face of the second planetary carrier extends radially outward to form a protective portion covering the output bearing and the base, and an operation gap is between the protective portion and an end face of the base.

2. The integrated articulated power unit according to claim 1, wherein, a motor unit is provided within the base, the motor unit comprising a motor rotor; and a cover plate and a cover plate fixing seat mated with each other are provided between a side wall of the motor rotor and the side wall of the base.

3. The integrated articulated power unit according to claim 2, wherein, the motor unit comprises a motor stator and a driving circuit board driving the motor unit which are fixed in the base.

4. The integrated articulated power unit according to claim 3, wherein, a sun wheel is coaxially fixed on the motor rotor, and a rotor rear bearing is provided between the motor rotor and the first planetary carrier;

the motor rotor is rotationally connected to the first planetary carrier by the rotor rear bearing;

a rotor front bearing is provided between the motor rotor and the second planetary carrier, and the motor rotor is rotationally connected to the second planetary carrier by the rotor front bearing; and the gearbox unit comprises an inner gear ring and a planetary gear which are mated with each other, an outer periphery of the inner gear ring is fixed directly within the mounting seat by being mated with the inner periphery of the mounting seat in a mutual concave-convex mating mode, and the sun wheel drives rotation of the planetary gear.

5. An integrated articulated power unit, wherein, a base and a gearbox unit disposed within the base are comprised, the gearbox unit comprising a first planetary carrier;

a mounting seat is coaxially provided within the base, and the first planetary carrier is sleeved within the mounting seat and is rotatable relative to the mounting seat;

a spacer and an input bearing are provided between the mounting seat and the first planetary carrier;

the first planetary carrier is assembled within the mounting seat by the input bearing and the spacer;

an edge of the spacer extends radially outward and against the mounting seat to form a concave groove matched with a thin-wall periphery of the end of the mounting seat, so as to snugly mate and connect the spacer with the thin-wall periphery of the end of the mounting seat; and the spacer is a cushion ring in a form of a circular ring.

6. A legged robot, comprising the integrated articulated power unit according to claim 1.

* * * * *